July 30, 1935.  C. H. HAPGOOD  2,009,399

MILKING MACHINE

Filed June 3, 1932  3 Sheets-Sheet 1

WITNESS:

INVENTOR
Cyrus Howard Hapgood

ATTORNEYS.

July 30, 1935.  C. H. HAPGOOD  2,009,399
MILKING MACHINE
Filed June 3, 1932  3 Sheets-Sheet 2

WITNESS:

INVENTOR
Cyrus Howard Hapgood
BY
ATTORNEYS.

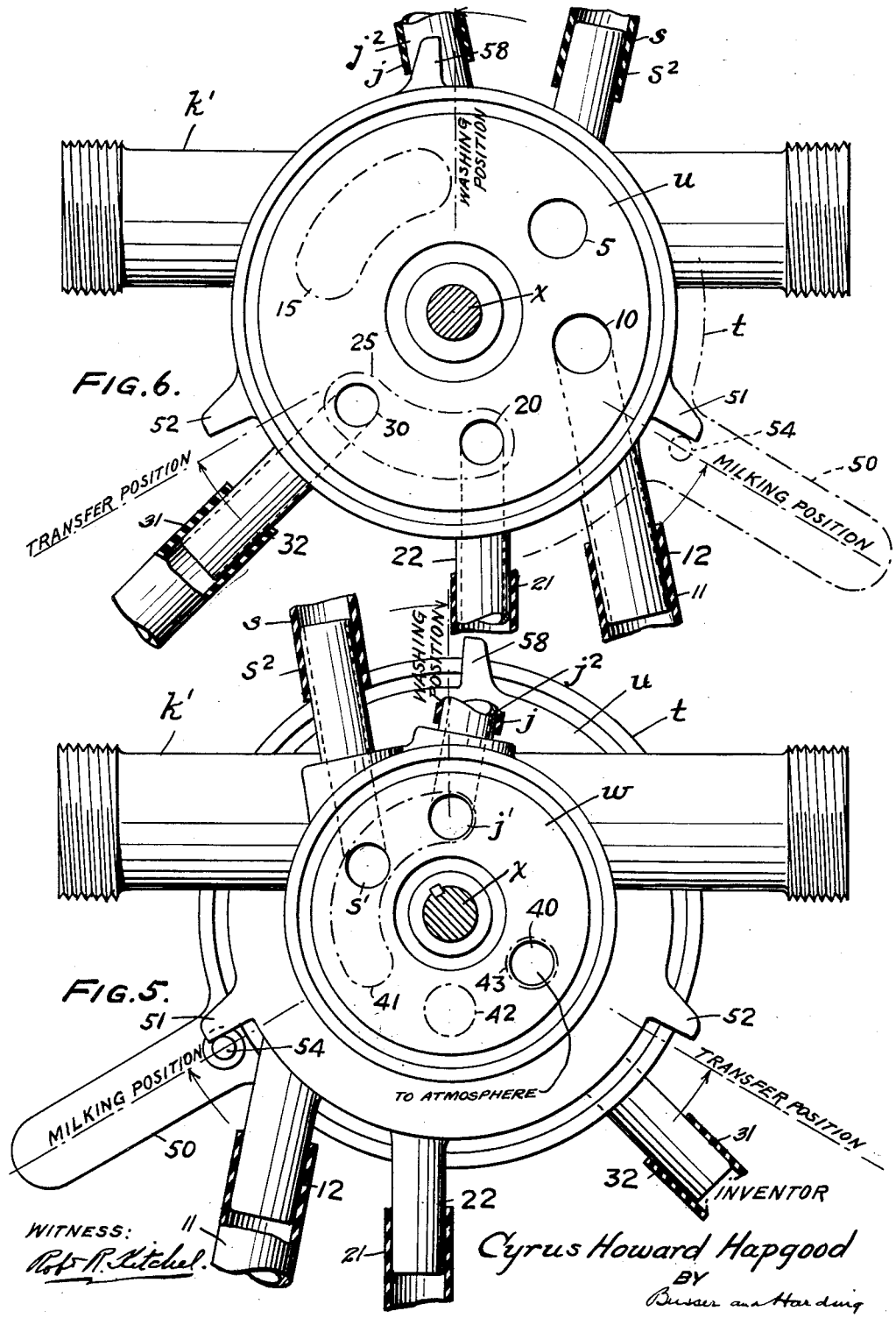

Patented July 30, 1935

2,009,399

UNITED STATES PATENT OFFICE 2,009,399

MILKING MACHINE

Cyrus Howard Hapgood, Nutley, N. J., assignor to The De Laval Separator Company, New York, N. Y., a corporation of New Jersey Application June 3, 1932, Serial No. 615,117

15 Claims. (Cl. 31—58)

In a patent issued to me February 23, 1932, No. 1,846,805, there is disclosed a milking machine comprising a milk pipe line, a vacuum pipe line, teat cups and a milk pail; in combination with a single master plug valve which, in the milking position, connects the pail top with a vacuum hose leading to the vacuum pipe line and with the teat cups, and which, in the milk discharge position, connects the pail top with atmosphere and the pail bottom with the milk pipe line. There is also mounted on the vacuum pipe line a vacuum valve which controls the connection of said vacuum hose with the vacuum pipe line.

The machine of this patent is operative, but there is danger of occasional leakage in the valve, due primarily to the difficulty of maintaining a plug valve tight after it becomes worn by use.

Leakage of air into the milk pipe line is a condition which should be guarded against with certainty, since it results in contamination of the milk.

The present invention has for its objects: to provide a master valve which will not leak; to change the valve arrangement so as to make the air connections entirely independent of the milk connections; also to prevent the machine from operating to milk if the vacuum valve is not operated in proper sequence with the master valve; also to provide for establishing, by means of the master valve, a new series of connections which will enable the whole milking machine to be flushed out.

A preferred embodiment of the invention is shown in the drawings, in which—

Fig. 5 is an elevational view of the master valve looking toward the left, Fig. 4, with the air-controlling valve removed but showing the ports therein in dotted lines.

Fig. 6 is an elevational view of the master valve element looking toward the right, Fig. 4, with the milk-controlling valve element removed but showing the ports therein in dotted lines.

Along the vacuum pipe line $a$ are mounted any number of Ts $b$ to any of which is attached a connector $c$ connected with a vacuum hose $d$ and a pneumatic pulsation hose $e$. The connector $c$ is ported to connect vacuum hose $d$ with the vacuum line $a$ and carries a magnetically operable pneumatic pulsation valve (not shown) whereby pulsation hose $e$ is connected alternately with the vacuum pipe line $a$ and with atmosphere.

The hose $d$ and $e$ connect with the valve chamber $f$ of a claw, the operation of the valve in this chamber being controlled by the pulsations in hose $e$ and producing pulsations in the outer or pulsation chambers of the teat cups $h$. The inner or milk chambers of the teat cups communicate, through the milk chamber $g$ of the claw, with the milk hose $21$. The teat cups and claw shown and briefly described may be constructed as shown in the Leitch Patent No. 1,255,186, February 5, 1918. The claw and the vacuum hose $d$ may be omitted and the pulsation hose $e$ may connect direct with the pulsation chambers of the teat cups and the milk or teat chambers of the teat cups may connect direct with hose $21$.

On the vacuum pipe line $a$ is mounted a two-way valve $m$, hereinafter described in detail. The master valve on the milk pipe line may be operated, as hereinafter fully described, to either connect the milk hose $21$ with a milk hose $31$ leading to the top of the pail $i$, or to connect the milk hose $11$ from the bottom of the pail $i$ with the milk pipe line $k$.

Figure 2:
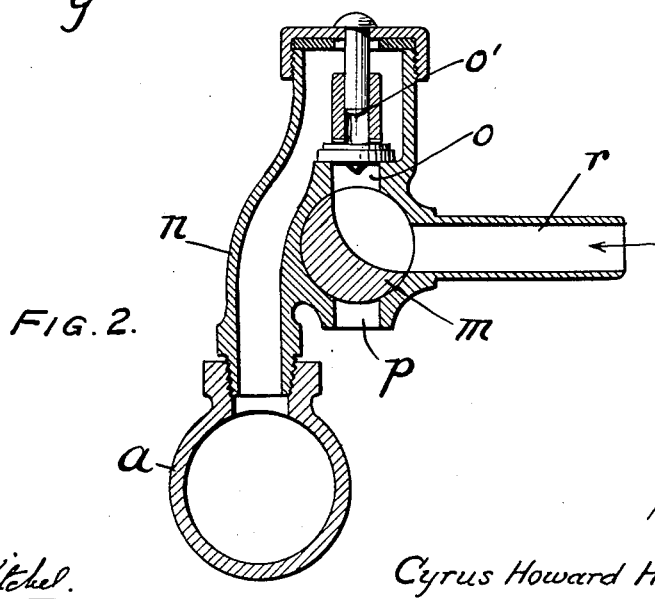
Fig. 2 is a sectional view of the two-way valve on the main vacuum pipe.

The valve $m$ during the milking period is in the position shown in Fig. 2. When the master valve is moved into the position shown in Figure 6 to connect hose $21$ and $31$, the pail is connected, through hoses $j$ and $s$, with the vacuum pipe line and milk is drawn from the teat cups $h$ into the pail $i$. When the master valve is moved into position to connect the hose $11$ from the pail bottom with the milk pipe line $k$, the top of the pail is connected with atmosphere through hose $j$ and milk is withdrawn from the pail into the milk pipe line $k$.

The valve $m$ (see Fig. 2) is mounted in a casing $n$ secured to and communicating with the vacuum pipe $a$. The casing is shaped to afford a passage extending upward from the vacuum pipe $a$ and is enlarged at the top and there provided with a downwardly extending port $o$ communicating with the chamber in which the valve $m$ is turnable. The valve chamber has two other ports, namely, an atmospheric port $p$ and a port opening into a nozzle $r$ which is adapted to be connected, by means of hose $s$ with nozzle $s^2$ of the master valve $v$. The valve $m$ is ported so that when moved into one position it connects nozzle $r$ and hose $s$ with vacuum port $o$ and when moved into the other position it connects nozzle $r$ and hose $s$ with the atmospheric port $p$. A check valve $o'$ is seated on the port $o$ and insures complete closure of the port $o$ except when the valve $m$ is in position to connect it with nozzle $r$ and the pressure in nozzle $r$ is greater than in vacuum pipe $a$.

Figure 4:
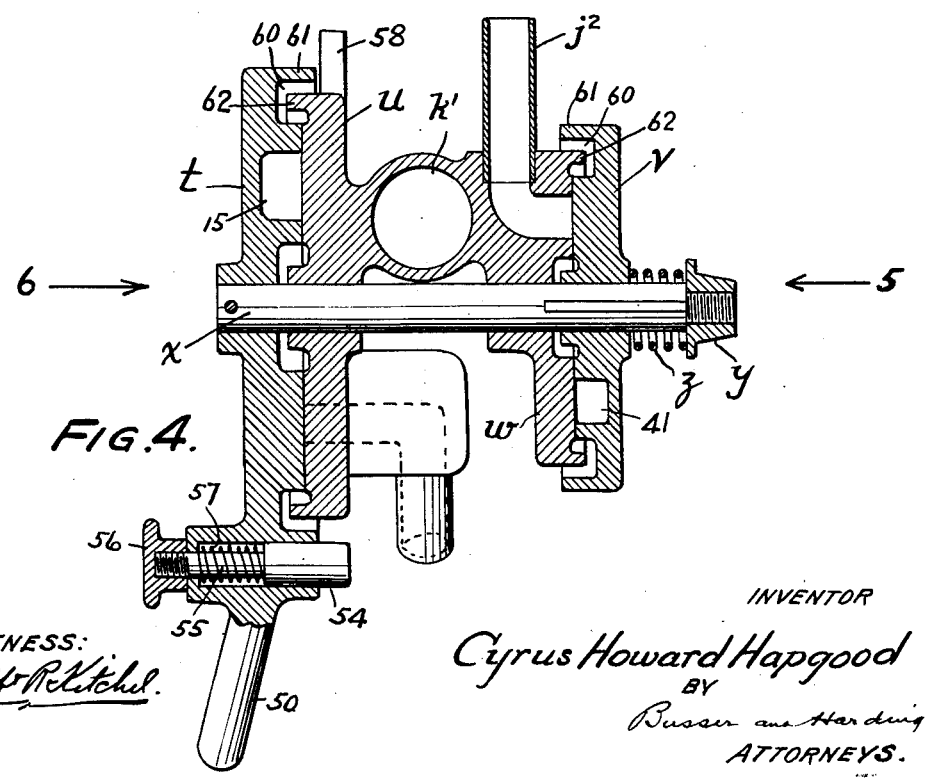
Fig. 4 is a section through the master valve.

Referring to Figs. 4, 5 and 6: The master valve is a compound valve constructed as follows: Secured on or integral with a pipe section $k'$ interposed in the milk pipe line is a casting enlarged at one end to form a disc-shaped valve block or seat $u$ and at the other end to form a disc-shaped valve block or seat $w$. Through this casting extends a turnable stud or shaft $x$, to one end of which is secured a disc-shaped milk valve $t$ applied to and turnable on the face of the valve block $u$ and to the other end of which is splined a disc-shaped air valve $v$ applied to and turnable on the face of the valve block $w$. The shaft $x$ has a reduced threaded end on which is screwed a nut $y$, between which and the valve $v$ is confined a coil spring $z$, whereby both valves $t$ and $v$ may be maintained in fluid-tight contact with their respective valve blocks.

The valve block $u$ is provided with four ports extending through it from face to face. One port 5 communicates with the milk pipe section $k'$. A second port 10 opens into a nozzle 12 (mounted on the valve block $u$) to which is connected the milk hose 11 that extends to the bottom of pail $i$. A third port 20 opens into a nozzle 22 (mounted on the valve block $u$) to which is connected the milk hose 21 that extends to the milk chamber $g$ of the teat cup claw. A fourth port 30 opens into a nozzle 32 (mounted on the valve block $u$) to which is connected the milk hose 31 that extends to the top of the pail $i$.

The valve $t$ is provided on its inner face with two arcuate recesses 15 and 25.

The valve block $w$ is provided with three ports extending through it from face to face. One port $j'$ opens into a nozzle $j^2$ to which is connected the air hose $j$ that extends to the top of pail $i$. A second port $s'$ opens into a nozzle $s^2$ to which is connected the air hose $s$ that extends, to the nozzle $r$ and vacuum valve $m$. A third port 40 opens to the atmosphere.

The valve $v$ is provided with an arcuate recess 41 and two circular holes 42 and 43 extending through it from face to face.

In Figs. 5 and 6 the master valve is shown in milking position. In this position, if valve $m$ has been turned to connect the hose $s$ with the vacuum pipe line $a$, the following air and milk connections are established. Air is exhausted from the top of the pail through hose $j$, port $j'$, recess 41, port $s'$, nozzle $s^2$, hose $s$, nozzle $r$, valve $m$ and vacuum pipe line $a$. Milk flows from the teat cups through hose 21, port 20, recess 25, port 30 and hose 31 into the milk pail $i$.

When the master valve is turned approximately 120° from the position shown in Figs. 5 and 6, communication between ports 20 and 30 is closed and recess 15 is moved into position to connect ports 5 and 10, thereby connecting the bottom of the pail, through milk hose 11, port 10, recess 15 and port 5, with the milk pipe line $k$. At the same time port 43 is moved into position to register with port $j'$, so that air flows through port 43, port $j'$, nozzle $j^2$ and air hose $j$ into the top of milk pail $i$. The air in the pail expels the milk, through hose 11, port 10, recess 15 and port 5, into the milk pipe line $k$.

It will be noted that, in this position of the master valve, port $s'$ opens against the solid face of the valve $t$, and therefore the vacuum valve $m$ is functionless.

The valve block $u$ carries stops 51 and 52 which are adapted to be engaged by a pin 54 on the valve $t$ when the valve is moved into the two positions above described. The valve is turned by means of a handle 50.

Pin 54 is seated in a hole formed in the valve $t$ and is provided with a stem 55 which extends beyond the hole and carries a head 56. A coil spring 57 surrounding the stem 55 presses the pin 54 into its normal position in alignment with stops 51 and 52. By grasping the head 56 the pin 54 may be retracted so as to clear the stop 51 and allow the master valve to be moved into a position about 120° from its milking and milk transfer positions until the pin 54 contacts with the stop 58. In this position, recess 25 of valve $t$ connects ports 5 and 10 and recess 15 of valve $t$ connects ports 20 and 30. This position of the valve allows the milking machine to be flushed out with cold water and then with steam; the flow being through the milk line $k$, port 5, recess 25, port 10, hose 11, milk pail $i$, hose 31, port 30, recess 15, port 20, hose 21 and the milk chamber $g$ of the claw to the milk chambers of the teat cups.

In this washing position of the valve, a part of the washing fluid escapes from the pail $i$ through air hose $j$ to recess 41 and hole 40 to the atmosphere, thereby flushing out of air hose $j$ any milk which may have passed thereinto as milk vapor during the milking operation. At the same time line hose $s$ is connected through port $s'$ and an aligning hole 42 with the atmosphere, while valve $m$ is so turned as to connect the other end of hose $s$ with atmosphere so that any condensate therein will drain out.

It is practicable to grind the opposing faces of valve $t$ and its valve seat and valve $v$ and its valve seat to perfect flatness, so as to eliminate danger of leakage. To further guard against leakage, due to damage while cleaning, each valve is provided with a circumferential recess 60 into which extends a peripheral flange 62 on the corresponding valve seat, and with a peripheral flange 61 which extends beyond and overlaps the periphery of said valve seat. Valve $t$ is protected at its center by affixed shaft $x$ and its seat is protected by a central raised boss. Valve $v$ is also protected at its center by a raised boss.

It is practicable to simplify the construction hereinbefore described by substituting, for hose 21 and 31 and the connections between them, a single through hose, and by eliminating the recess 25 in the valve $t$ and the ports 20 and 30 in the valve block $u$ and the nozzles 22 and 32 carried thereon. Valve $v$ may also be eliminated. This construction forms the subject-matter of a separate application filed June 3, 1932, Serial No. 615,118.

Figure 1:
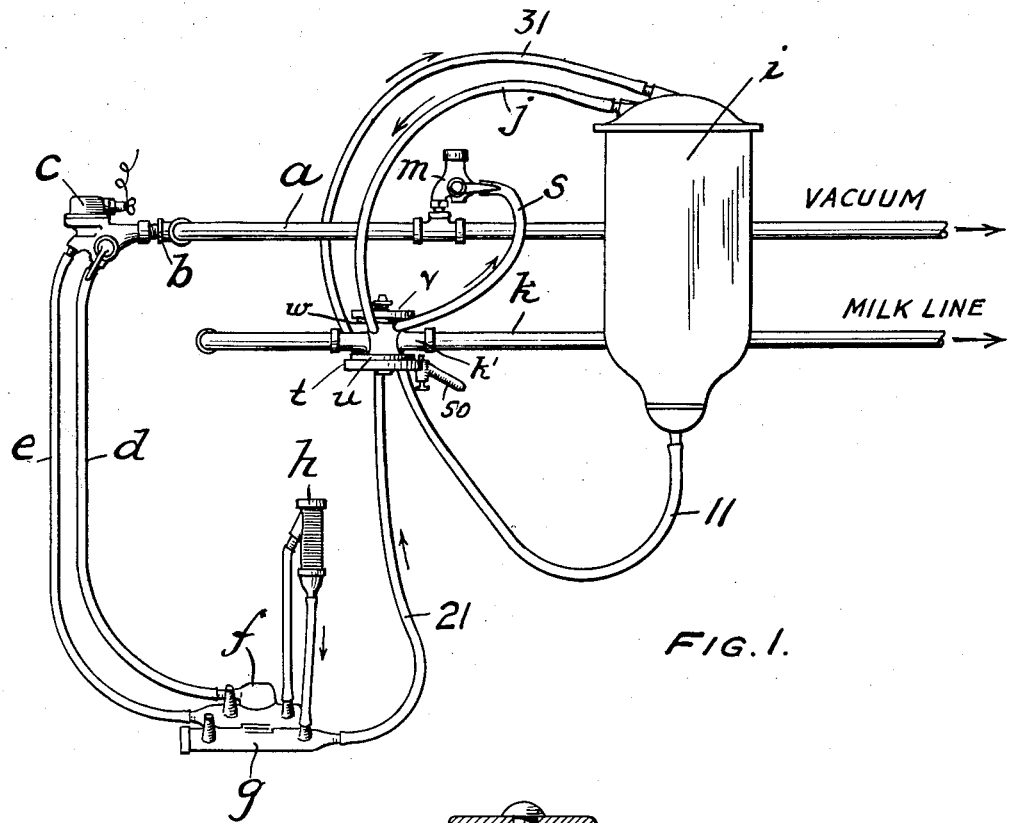
Fig. 1 is a diagram of the milking mechanism, with the shaft of the master valve shown vertical, instead of horizontal, in order to more clearly show the hose connections.
Figure 3:
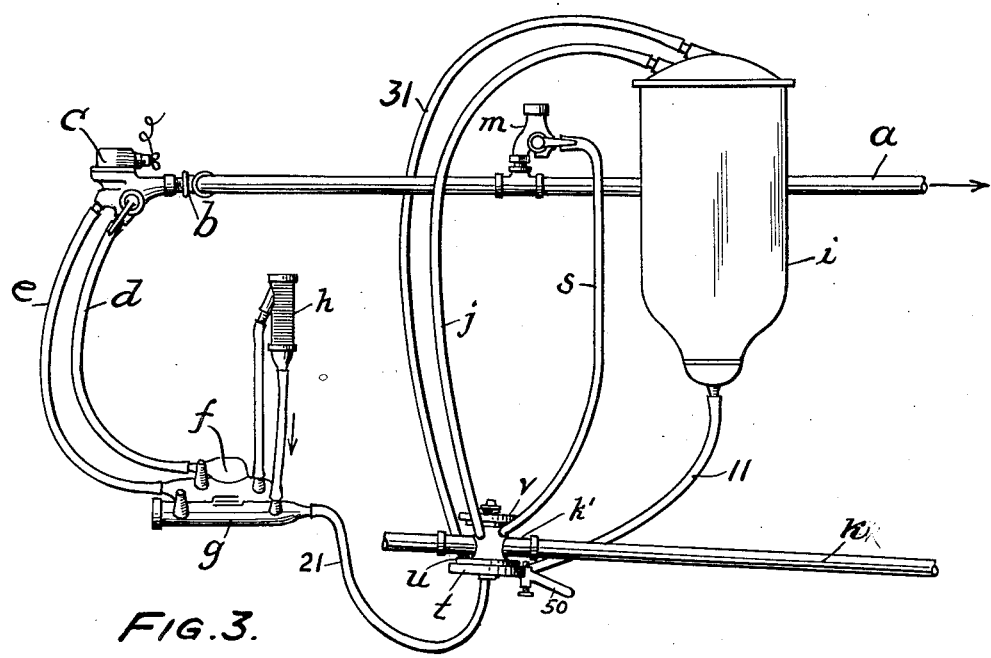
Fig. 3 is a view, similar to Fig. 1, of a modification.

In Fig. 1 the milk pipe line $k$ is intended for connection, through some form of receiving tank which is under vacuum. In Fig. 3 the milk pipe line $k$ is shown in such position substantially below the bottom of the pail $i$ as to allow the milk to be withdrawn from the pail by gravity supplemented by the described air pressure in the pail. In other respects the constructions may be the same as that of the machine shown in Fig. 1.

In vacuum pipe line $a$ there will be, at times, considerable fluctuations of pressure, for instance, when the teat cups fall off one of the cows or a valve is inadvertently opened. These fluctuations of pressure would ordinarily cause air and possibly moisture to flow back to valve $v$ and into pail $i$. Valve $o'$ prevents this and, being placed on the vacuum line, protects the whole milking apparatus from such contamination.

It will be understood that when reference is made to establishing connections with vacuum and atmosphere respectively, I mean to include as an equivalent any two substantially different absolute pneumatic pressures.

I do not herein claim the construction of the master valve, the same forming the subject-matter of a separate application filed June 3, 1932, Serial No. 615,119.

What I claim and desire to protect by Letters Patent is:

1. In a milking machine, the combination with a milk pipe line, a source of vacuum, a milk pail and a teat cup unit, of a milk valve movable into two positions to connect the milk pail respectively with the teat cup units and the milk pipe line, two air valves which must be operated to connect the milk pail with the source of vacuum, one of said air valves being movable into position to connect the milk pail with atmosphere regardless of the position of the other air valve, and means, including connections between the milk valve and the first named air valve, to move them together into one position to simultaneously connect the pail with the source of vacuum and with the teat cup unit and into another position to simultaneously connect the pail with atmosphere and with the milk pipe line.

2. In a milking machine, the combination with a milk pipe line, a milk pail and a teat cup unit, of a milk valve movable into one position adapted to connect the teat cup unit with the top of the pail, into a second position adapted to connect the bottom of the pail with the milk pipe line, and into a third position adapted to simultaneously establish both said connections in order to enable the milk pail and teat cups to be flushed out with a washing fluid.

3. In a milking machine, the combination with a milk pipe line, a milk pail and a teat cup unit, of a milk valve, a hose connecting the milk valve with the bottom of the pail, a hose connecting the milk valve with the top of the pail, a hose connecting the milk valve with the teat cup unit, said milk valve being movable into one position to connect the second and third hose, into another position to connect the first hose with the milk pipe line, and into a third position to simultaneously establish both said connections to enable the milk pail, the teat cups and all the hose to be flushed out with a washing fluid.

4. In a milking machine, the combination with a vacuum pipe line, a milk pipe line, a milk pail and a teat cup unit, of a milk valve movable into one position adapted to connect the teat cup unit with the top of the pail, into a second position adapted to connect the bottom of the pail with the milk pipe line and into a third position adapted to simultaneously establish both said connections, a separate air valve, an air hose between the vacuum pipe line and said air valve, an air hose connecting the pail and said air valve, said air valve being movable into one position to connect said hose, into a second position to connect the hose to the milk pail with atmosphere and into a third position to connect the hose to the milk pail with atmosphere, and means connecting said valves and constraining them to move in unison so that when one valve occupies its first, second or third specified position the other valve will occupy respectively its first, second or third specified position.

5. In a milking machine, the combination with a vacuum pipe line, a milk pipe line, a milk pail, a teat cup unit and means through which milk may be conveyed from the teat cup unit to the pail, of means to connect and disconnect the pail with the milk pipe line, a valve movable into position to connect the pail with either the vacuum pipe line or the atmosphere, and a check valve adapted, when said valve is positioned to connect the pail with the vacuum pipe line, to prevent back flow of air or moisture through said valve from the vacuum pipe.

6. In a milking machine, the combination with a vacuum pipe line, a milk pipe line, a milk pail and a teat cup unit, of means affording a passage connecting the pail and the vacuum line through which air is adapted to flow and means affording a second passage connected with the pail through which air is adapted to flow, means affording a third passage connecting the teat cup unit and pail through which milk is adapted to flow and means affording a fourth passage connecting the pail and milk line through which milk is adapted to flow, valve mechanism movable into one position to establish flow of air from the pail to the vacuum line through the first passage and flow of milk from the teat cup unit to the pail through the third passage, and movable into another position to establish a flow of air to the pail through the second passage and a flow of milk from the pail to the milk line through the fourth passage, said valve mechanism comprising a separate air valve and a separate milk valve controlling fluid flow through the first and second passages and through the third and fourth passages respectively, and means connecting said valves and constraining them to move in unison to establish the specified flow of fluid.

7. In a milking machine, the combination with a vacuum pipe line, a milk pipe line, a milk pail and a teat cup unit, of valve mechanism movable into one position to establish a milk flow connection between the teat cup unit and the top of the pail and an air flow connection between the pail and the vacuum pipe line, and movable into another position to establish a milk flow connection between the bottom of the pail and the milk pipe line and to connect the pail with atmosphere; said valve mechanism comprising a valve block and two separate valves, one of said valves and the valve block having cooperating ports and passages adapted to establish said milk flow connections and the other of said valves and the valve block having ports and passages adapted to establish said air flow connections, and means connecting said valves and constraining them to move in unison.

8. In a milking machine, the combination with a vacuum pipe line, an air hose communicating with the vacuum line, a milk pipe line, a milk pail, an air hose communicating with the pail and a teat cup unit, of valve mechanism movable into one position to establish a milk flow connection between the teat cup unit and the top of the pail and to connect said air hose and movable into another position to establish a milk flow connection between the bottom of the pail and the milk pipe line and to connect the milk pail with the atmosphere through the second named air hose; said valve mechanism comprising a valve block and two separate valves, one of said valves and the valve block having cooperating ports and passages adapted to establish said milk flow connections and the other of said valves and the valve block having ports and passages adapted to establish said air flow connections, and means connecting said valves and constraining them to move in unison.

9. In a milking machine, the combination with a source of vacuum, a milk pipe line, a milk pail, a tea cup unit, milk hose connected respectively with the bottom of the pail, with the top of the pail and with the teat cups, and air hose connected with the top of the pail, of valve mechanism movable into one position to connect the milk hose to the teat cup unit with the milk hose to the top of the pail and the air hose to the top of the pail with vacuum and movable into another position to connect the milk hose to the bottom of the pail with the milk pipe line and the air hose to the top of the pail with atmosphere; said valve mechanism comprising a valve block and two separate valves, one of said valves and the valve block having cooperating ports and passages adapted to establish said milk flow connections and the other of said valves and the valve block having ports and passages adapted to establish said air flow connections, and means connecting said valves and constraining them to move in unison.

10. In a milking machine, the combination with a vacuum pipe line, an air hose communicating with the vacuum line, a milk pipe line, a milk pail, an air hose communicating with the pail and a teat cup unit, of valve mechanism movable into one position to establish a milk flow connection between the teat cup unit and the top of the pail and to connect said air hose and movable into another position to establish a milk flow connection between the bottom of the pail and the milk pipe line and to connect the milk pail with the atmosphere through the second named air hose; said valve mechanism comprising two separate valves adapted to establish said milk flow connections and said air flow connections respectively, and means connecting said valves and constraining them to move in unison; and a third and independently operable valve controlling communication between the first named air hose and the vacuum line.

11. In a milking machine, the combination with a vacuum pipe line, an air hose communicating with the vacuum line, a milk pipe line, a milk pail, an air hose communicating with the pail and a teat cup unit, of valve mechanism movable into one position to establish a milk flow connection between the teat cup unit and the top of the pail and to connect said air hose and movable into another position to establish a milk flow connection between the bottom of the pail and the milk pipe line and to connect the milk pail with the atmosphere through the second named air hose; said valve mechanism comprising a valve block and two separate valves, one of said valves and the valve block having cooperating ports and passages adapted to establish said milk flow connections and the other of said valves and the valve block having ports and passages adapted to establish said air flow connections, means connecting said valves and constraining them to move in unison, and a third and independently operable valve controlling communication between the first named air hose and the vacuum pipe line.

12. In a milking machine, the combination with a vacuum pipe line, a milk pipe line, a milk pail and a teat cup unit, of valve mechanism movable into one position to establish a milk flow connection between the teat cup unit and an air flow connection between the pail and the vacuum line, and movable into another position to establish a milk flow connection between the bottom of the pail and the milk line and to connect the pail with atmosphere; said valve mechanism comprising a valve block having valve seats on opposite faces thereof, a turnable shaft extending through said block, a milk valve turnable with the shaft and on one valve seat, an air valve turnable with the shaft and on the other valve seat, the milk valve and its seat having coperating ports and passages adapted to establish said milk flow connections and the air valve and its seat having cooperating ports and passages adapted to establish said air flow connections.

13. In a milking machine, the combination with a vacuum pipe line, an air hose communicating with the vacuum line, a milk pipe line, a milk pail, an air hose communicating with the pail and a teat cup unit, of valve mechanism movable into one position to establish a milk flow connection between the teat cup unit and the top of the pail and to connect said air hose and movable into another position to establish a milk flow connection between the bottom of the pail and the milk pipe line and to connect the milk pail with the atmosphere through the second named air hose; said valve mechanism comprising a valve block having valve seats on opposite faces thereof, a turnable shaft extending through said block, a milk valve turnable with the shaft and on one valve seat, an air valve turnable with the shaft and on the other valve seat, the milk valve and its seat having cooperating ports and passages adapted to establish said milk flow connections and the air valve and its seat having cooperating ports and passages adapted to establish said air flow connections.

14. In a milking machine, the combination with a source of vacuum, a milk pipe line, a milk pail, a teat cup unit, milk hose connected respectively with the bottom of the pail, with the top of the pail and with the teat cups, an air hose connected with the top of the pail, of valve mechanism movable into one position to connect the milk hose to the teat cup unit with the milk hose to the top of the pail and the air hose to the top of the pail with vacuum and movable into another position to connect the milk hose to the bottom of the pail with the milk pipe line and the air hose to the top of the pail with atmosphere; said valve mechanism comprising a valve block having valve seats on opposite faces thereof, a turnable shaft extending through said block, a milk valve turnable with the shaft and on one valve seat, an air valve turnable with the shaft and on the other valve seat, the milk valve and its seat having cooperating ports and passages adapted to establish said milk flow connections and the air valve and its seat having cooperating ports and passages adapted to establish said air flow connections.

15. In a milking machine, the combination with a vacuum pipe line, an air hose communicating with the vacuum line, a milk pipe line, a milk pail, an air hose communicating with the pail and a teat cup unit, of valve mechanism movable into one position to establish a milk flow connection between the teat cup unit and the top of the pail and to connect said air hose and movable into another position to establish a milk flow connection between the bottom of the pail and the milk pipe line and to connect the milk pail with the atmosphere through the second named air hose; said valve mechanism comprising a valve block having valve seats on opposite faces thereof, a turnable shaft extending through said block, a milk valve turnable with the shaft and on one valve seat, an air valve turnable with the shaft and on the other valve seat, the milk valve and its seat having cooperating ports and passages adapted to establish said milk flow connections and the air valve and its seat having cooperating ports and passages adapted to establish said milk flow connections, and a third independently operable valve controlling communication between the first named air hose and the vacuum pipe line.

CYRUS HOWARD HAPGOOD.